(12) United States Patent
Ishiji et al.

(10) Patent No.: US 11,444,557 B2
(45) Date of Patent: Sep. 13, 2022

(54) SEMICONDUCTOR DEVICE AND MOTOR DRIVING SYSTEM USING THE SAME

(71) Applicant: RENESAS ELECTRONICS CORPORATION, Tokyo (JP)

(72) Inventors: Seigi Ishiji, Tokyo (JP); Minoru Kurosawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/148,402

(22) Filed: Jan. 13, 2021

(65) Prior Publication Data

US 2021/0273589 A1  Sep. 2, 2021

(30) Foreign Application Priority Data

Mar. 2, 2020 (JP) .............................. JP2020-034935

(51) Int. Cl.
*H02P 6/182* (2016.01)
*H02P 6/28* (2016.01)
*H02P 6/18* (2016.01)
*H02M 7/5387* (2007.01)

(52) U.S. Cl.
CPC ........ *H02P 6/182* (2013.01); *H02M 7/53873* (2013.01); *H02P 6/187* (2013.01); *H02P 6/28* (2016.02)

(58) Field of Classification Search
CPC .. H02M 7/53873; H02M 1/0009; H02P 6/187
See application file for complete search history.

(56) References Cited

U.S. PATENT DOCUMENTS

| 10,693,396 B2 | 6/2020 | Narumi | |
| 2007/0029956 A1* | 2/2007 | Hofer | H02P 6/185 318/276 |
| 2008/0252240 A1* | 10/2008 | Sugie | H02P 6/182 318/400.06 |
| 2009/0189556 A1* | 7/2009 | Itagaki | H02P 6/182 318/400.11 |
| 2013/0234634 A1* | 9/2013 | Hofer | A63H 29/22 318/400.09 |

FOREIGN PATENT DOCUMENTS

JP  2019-103369 A  6/2019

* cited by examiner

*Primary Examiner* — Said Bouziane
(74) *Attorney, Agent, or Firm* — McDermott Will & Emery LLP

(57) ABSTRACT

A gate drive semiconductor device includes: external terminals to which PWM control signals are supplied; external terminals outputting a drive signal for driving a three-phase BLDC motor; external terminals to which the counter electromotive voltage generated by driving the three-phase BLDC motor is supplied; a zero-cross determination unit generating an interrupt signal indicating timing at which the counter electromotive voltage intersects with a midpoint potential of the three-phase BLDC motor based on the PWM control signal and the counter electromotive voltage; and an external terminal outputting the interrupt signal.

13 Claims, 9 Drawing Sheets

FIG. 4

| Signal | A rising edge | C falling edge | B rising edge | A falling edge | C rising edge | B falling edge | A rising edge |
|---|---|---|---|---|---|---|---|
| HIA | Lo | Hi | Lo Lo Hi | Lo | Lo | Hi Lo Lo | ... |
| LIA | Lo | Lo | Hi Lo Lo | Lo | Hi | Lo Lo Hi | ... |
| HIB | Lo | Hi Lo Lo | Lo | Hi | Lo Lo Hi | Lo | ... |
| LIB | Hi | Lo Lo Hi | Lo | Lo | Hi Lo Lo | Lo | ... |
| HIC | Lo Lo Hi | Lo | Lo | Hi Lo Lo | Lo | Hi | ... |
| LIC | Hi Lo Lo | Lo | Hi | Lo Lo Hi | Lo | Lo | ... |
| SMPEN | Lo Lo Hi | Lo Lo Hi | Lo Lo Hi | Lo Lo Hi | Lo Lo Hi | Lo Lo Hi | ... |
| BDETA | Hi | Lo | Lo | Hi | Lo | Lo | ... |
| BDETB | Lo | Lo | Hi | Lo | Lo | Hi | ... |
| BDETC | Lo | Hi | Lo | Lo | Hi | Lo | ... |

FIG. 6A
FIG. 6B
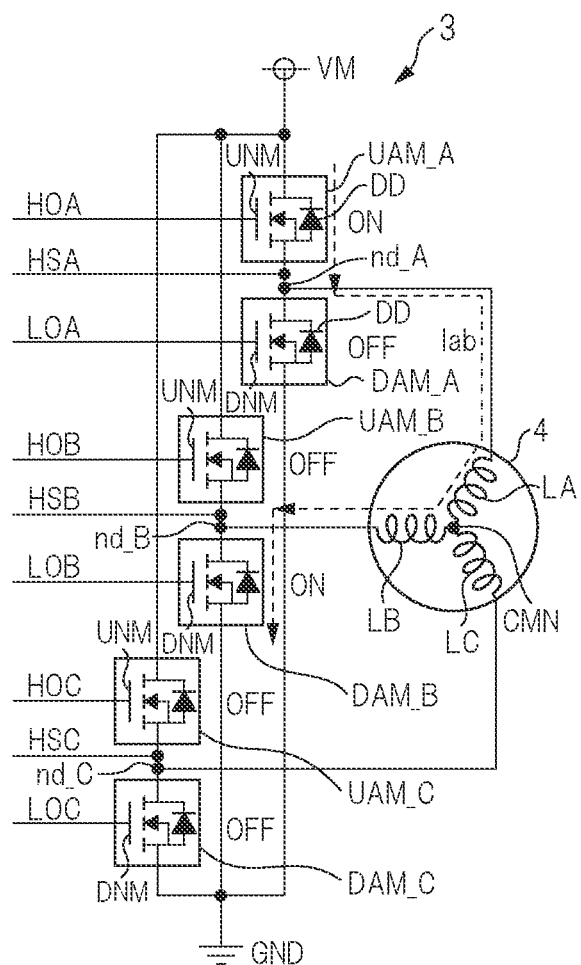
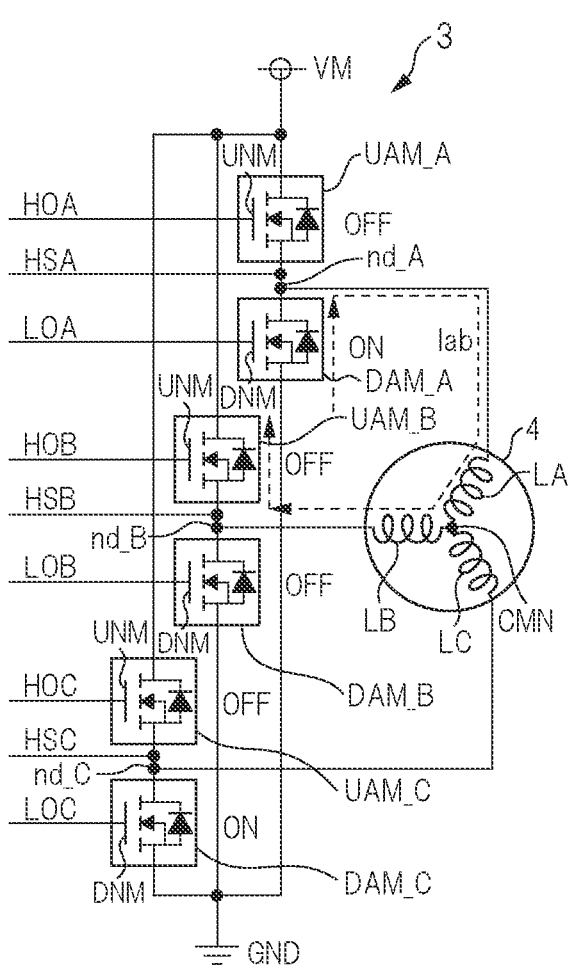
FIG. 6C
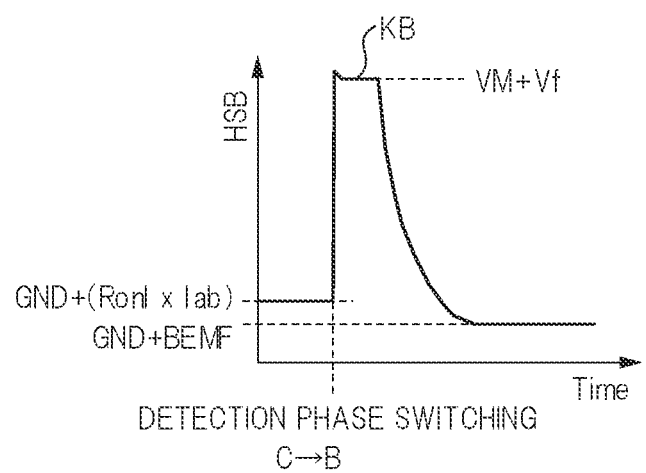

SEMICONDUCTOR DEVICE AND MOTOR DRIVING SYSTEM USING THE SAME

CROSS-REFERENCE TO RELATED APPLICATION

The present application claims priority from. Japanese Patent Application No. 2020-034935 filed on Mar. 2, 2020, the content of which is hereby incorporated by reference into this application.

TECHNICAL FIELD OF THE INVENTION

The present invention relates to a semiconductor device and a motor driving system using the same, for example, to a semiconductor device suitable for a multiphase sensorless motor and a motor driving system including the multiphase sensorless motor.

BACKGROUND OF THE INVENTION

Included as an example of a multiphase sensorless motor (hereinafter, also referred to as a sensorless motor or simply a motor) is a brushless direct current (BLDC) motor. A technique for detecting a rotation speed of the BLDC motor is disclosed in Patent Document 1 (JP 2019-103369 A1). Generally included as a method of detecting the rotation speed is a method of measuring an electrical rotation period by detecting the timing at which a counter electromotive voltage (BEMF) generated by rotation of the BLDC motor intersects with a midpoint potential. In this case, appropriately switching a motor driving phase based on the rotation period obtained by the measurement makes it possible to control the rotation speed of the BLDC motor.

SUMMARY OF THE INVENTION

In recent years, increased has been a demand for high-speed rotation in motors used in power tools and the like. Thus, the high-speed detection of the counter electromotive voltage for measuring the rotation period is also required in accordance with the high-speed rotation of the motor.

The other problems and novel characteristics of the present invention will be apparent from the description of the present specification and the accompanying drawings.

A semiconductor device according to an embodiment is as follows.

That is, a semiconductor device includes: a first external terminal to which a pulse width control signal is supplied; a second external terminal outputting a drive signal for driving a multiphase sensorless motor; a third external terminal to which a counter electromotive voltage generated by driving the multiphase sensorless motor is supplied; a zero-cross determination unit generating an interrupt signal based on the pulse width control signal and the counter electromotive voltage, the interrupt signal indicating timing at which the counter electromotive voltage intersects with a midpoint potential of the multiphase sensorless motor; and a fourth external terminal outputting the interrupt signal.

According to an embodiment, provided can be a semiconductor device and a motor driving system that are capable of rotating a multiphase sensorless motor at a high speed.

BRIEF DESCRIPTIONS OF THE DRAWINGS

FIG. 4 is a diagram for explaining an operation of a counter electromotive detection logic according to a second embodiment;

FIG. 6A is a diagram for explaining a kickback operation;

FIG. 6B is a diagram for explaining the kickback operation;

FIG. 6C is a diagram for explaining the kickback operation;

DESCRIPTIONS OF THE PREFERRED EMBODIMENTS

Figure 1:
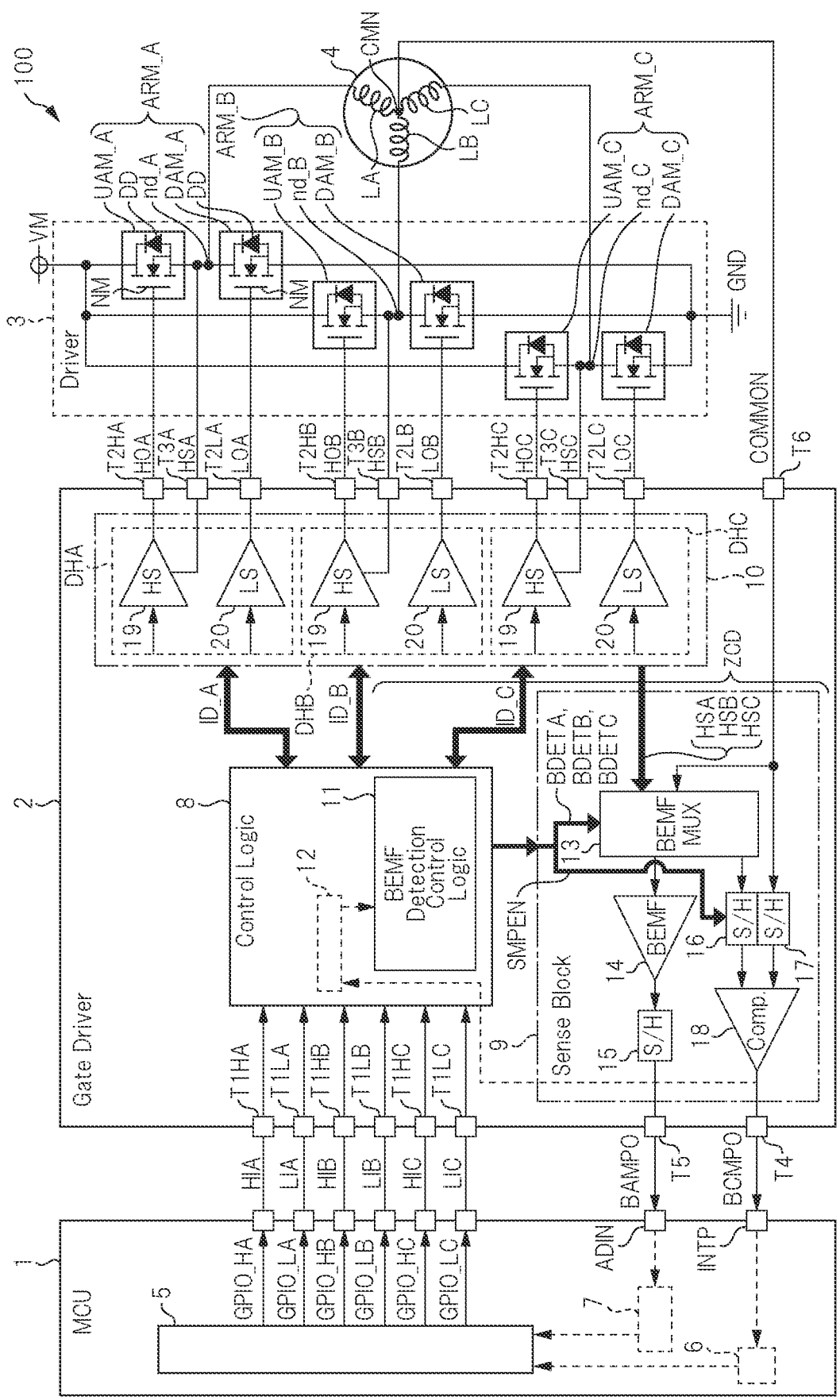
FIG. 1 is a block diagram showing a configuration of a motor driving system according to a first embodiment.

Hereinafter, embodiments of the present invention will be described with reference to the drawings. Incidentally, the disclosure is merely an example, and appropriate changes that can be easily arrived at by those skilled in the art while maintaining the gist of the invention are naturally included in the scope of the present invention. Further, in order to clarify the explanation, the drawings may schematically represent the width, thickness, and shape, etc. of each part as compared with the actual embodiment, but is just an example and does not limit the interpretation of the present invention.

Further, in the present specification and each of the drawings, the same elements as those mentioned about the above-described drawings may be denoted by the same reference numerals, and detailed description thereof may be omitted appropriately.

Examination Example

Figure 9:
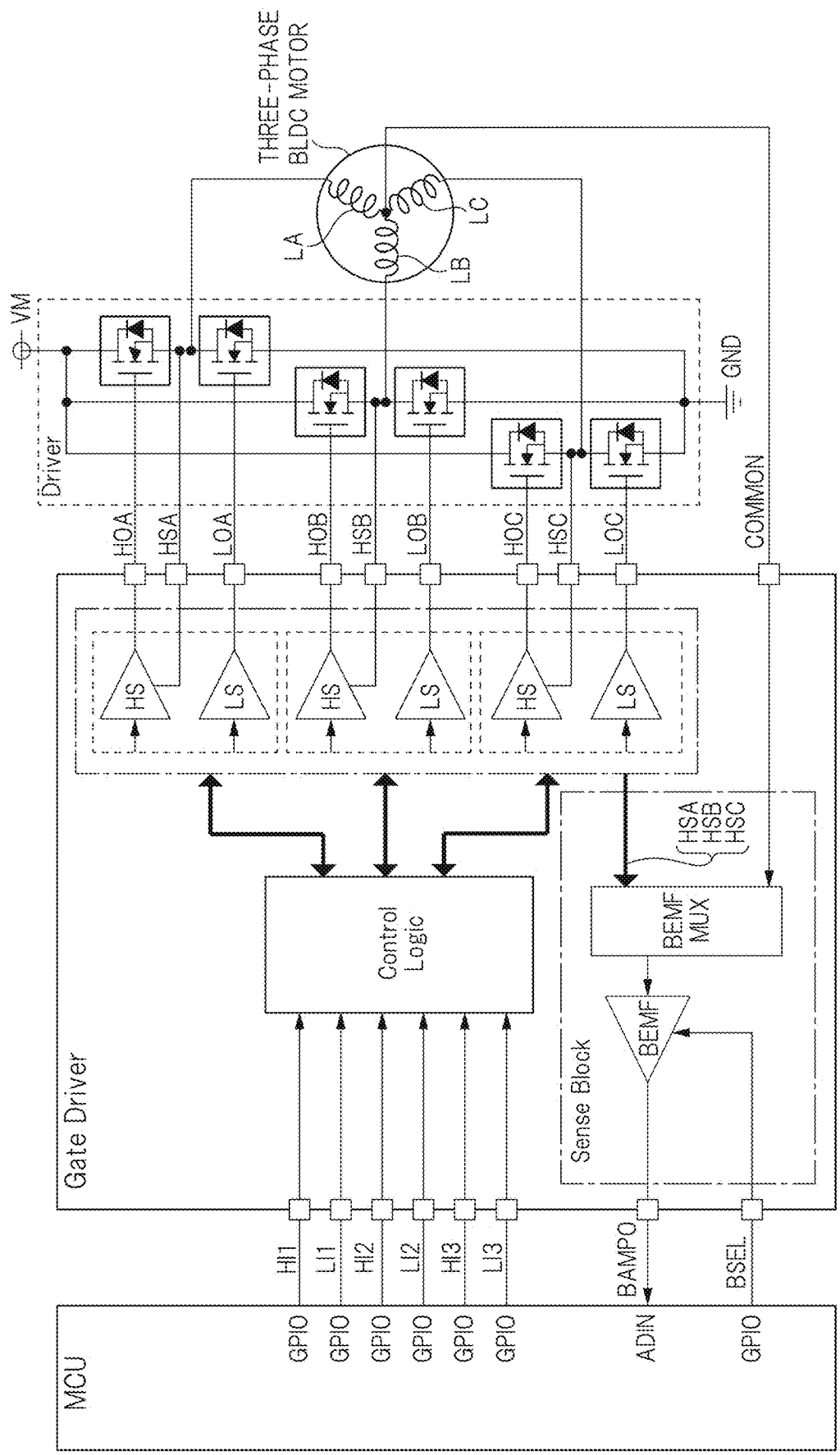
FIG. 9 is a block diagram showing a configuration of a motor driving system that has been studied prior to the present invention.

Prior to the present invention, an examination example by the inventors of the present application will be described with reference to the drawings. FIG. 9 is a block diagram showing a configuration of a motor driving system that has been examined prior to the present invention.

Here, as a sensorless motor, a three-phase BLDC motor will be described as an example. A microprocessor (hereinafter, also referred to as a processor) MCU outputs, to a gate driver Gate_Driver, a pulse width control signal (hereinafter, also referred to as a PWM control signal) for driving a three-phase BLDC motor. The gate driver Gate_Driver supplies, to a driver Driver, a drive signal in accordance with the supplied PWM control signal. The three-phase BLDC motor is rotated by the drive signal from the driver Driver.

When the three-phase BLDC motor rotates, the three-phase BLDC motor generates a counter electromotive voltage. In the motor driving system shown in FIG. 9, this counter electromotive voltage is detected to control a rotation speed of the three-phase BLDC motor. Next, detection timing for detecting the counter electromotive voltage will be described.

The three-phase BLDC motor includes, for example, a stator formed by a magnet, and three-phase coils LA to LC attached to a rotor surrounded by the stator. As the rotor rotates, the counter electromotive voltage is generated in the coils LA to LC. Further, the counter electromotive voltage is detected in a phase to be measured at the timing when the coil of the target phase for detecting the counter electromotive voltage is put into a high impedance state and the timing when a potential difference is applied to the coils of the remaining two phases. Since the timing of applying the potential difference to the coils of the respective phases is performed by PWM control, the timing at which the counter electromotive voltage can be detected is limited.

Among voltages HSA to HSC applied to the three-phase coils LA to LC and a midpoint potential COMMON, the voltages HSA to HSC or midpoint potential COMMON in the phase to be measured are selected by a sense unit Sense Block in the gate driver Gate_Driver. The selected voltage is supplied as a selection voltage BAMPO to an analog external input terminal ADIN of a processor MCU via an external terminal of the gate driver Gate_Driver which is a semiconductor device. The voltage of the phase to be measured is a value summed by the midpoint potential and the counter electromotive voltage, and a value of the counter electromotive voltage changes depending on the rotation speed of the three-phase BLDC motor, so that the selection voltage BAMPO is an analog signal. Therefore, the processor MCU needs an analog/digital (A/D) conversion circuit for performing analog/digital (A/D) conversion so as to be capable of performing a digital processing to the supplied counter electromotive voltage.

The processor MCU manages all the timings for operating the three-phase BLDC motor, and so operates the A/D conversion circuit at appropriate timings to perform the A/D conversion to the selection voltage BAMPO. By this conversion, the processor MCU obtains a digital value of the midpoint potential COMMON and a digital value of the voltage of the phase to be measured. Comparing these two digital values makes it possible for the processor MCU to determine the timing (zero-cross determination) at which the counter electromotive voltage and the midpoint potential COMMON intersect (zero cross). In addition, the processor MCU uses a conversion result of the A/D conversion to calculate an electrical rotation period of the three-phase motor, thereby making it possible to change the PWM control signal so as to switch a drive phase of the three-phase BLDC motor at the appropriate timing. That is, the processor MCU changes the PWM control signal so as to appropriately switch the phase, through which the drive current flows, based on the electrical rotation period obtained by the calculation.

However, as described above, since the counter electromotive voltage is an analog signal, an A/D conversion circuit is required to be processed by the processor. Further, the zero-cross determination and the electrical rotation period need to be calculated from the conversion result of the A/D conversion. In order to perform these calculations, a processing time is required depending on processing capacity of the processor MCU, and these processing times bring delay in switching the drive phase of the three-phase BLDC motor, which limits an upper limit value of the rotation speed of the three-phase BLDC motor.

That is, in order to make the zero-cross determination of the counter electromotive voltage, the processor MCU needs to take many steps such as A/D conversion and comparison calculation with the midpoint potential, and so needs the processing time for carrying out these steps. Therefore, in trying to rotate the three-phase BLDC motor at high speed, the time necessary for the zero-cross determination of the counter electromotive voltage brings delay in the control by the processor MCU, thereby leading to causing the limitation of the rotation speed of the three-phase BLDC motor. In this case, even if a processor MCU with high processing power is applied to the motor driving system, a problem arises about the limit of the upper limit value of the rotation speed of the three-phase BLDC motor because a series of procedures related to the zero-cross determination is not omitted.

As a means for solving the above-mentioned problem related to the limit of the rotation speed, the inventors of the present application have configured, by hardware, a part of a function for estimating the rotation speed of the motor from the counter electromotive voltage, and has examined incorporation of the hardware into the gate driver Gate Driver which is a semiconductor device. In this case, the gate driver generates a midpoint potential or a virtual midpoint potential corresponding to the midpoint potential, generates a timing signal indicating the timing at which the counter electromotive voltage and the virtual midpoint potential intersect, and outputs this timing signal from the gate driver Gate_Driver to the processor MCU. This makes it possible to greatly reduce a load on the processor MCU.

However, the present inventors have found that in trying to adopt such a configuration, two new problems arise.

A first problem is a problem regarding the timing of detecting the counter electromotive voltage generated by the motor. The target phase for detecting the counter electromotive voltage is a non-energized phase as described above. This needs to put the coil of the target phase into a high impedance state and the coil of the other phase into a driving state (a state with a potential difference), but the gate driver Gate_Driver has no information on the timing of detecting the counter electromotive voltage.

A second problem is a problem regarding the phase for detecting the counter electromotive voltage. The gate driver Gate Driver has no information indicating where the rotor of the motor is located. Therefore, it is difficult for the gate driver Gate_Driver to identify the target phase for detecting the counter electromotive voltage.

First Embodiment

<Configuration of Motor Driving System>

FIG. 1 is a block diagram showing a configuration of a motor driving system according to a first embodiment. In the figure, the reference numeral 100 denotes a motor driving system. The motor driving system 100 includes a processor (MCU) 1, a gate drive semiconductor device (Gate_Drive) 2, a driver (Driver) 3, and a three-phase BLDC motor 4. Here, the three-phase BLDC motor 4 will be described as an example of a multiphase sensorless motor, but the number of phases and the like are not limited to this. In addition, except for the three-phase BLDC motor 4, the motor driving system 100 may be configured by the processor 1, the gate drive semiconductor device 2, and the driver 3. Further, the processor 1 may also be used with a system other than the motor driving system 100.

<<Processor 1>>

The processor 1 is not particularly limited, but is composed of one semiconductor device. The processor 1 includes a plurality of circuit blocks, but only the circuit blocks necessary for explanation are drawn in FIG. 1. In the same figure, the reference numeral 5 denotes a processor core that operates in accordance with a program, the reference numeral 6 denotes a counter, and the reference numeral 7 denotes an A/D conversion circuit. The processor 1 further includes external input/output terminals GPIO_HA to GPIO_HC and GPIO_LA to GPIO_LC provided in the semiconductor device, an analog external input terminal ADIN, and an interrupt external input terminal INT.

When controlling the three-phase BLDC motor 4 in accordance with the program, the processor core 5 generates PWM control signals HIA to HIC and LIA to LIC, and outputs them to the external input/output terminals GPIO_HA to GPIO_HC and GPIO_LA to GPIO_LC. Incidentally, the PWM control signals HIA to HIC are PWM control signals used for controlling an upper arm included in the driver 3 described later, and the PWM control signals LIA to LIC are PWM control signals used for controlling a lower arm included in the driver 3 described later.

The counter 6 is not particularly limited, but starts counting in response to an interrupt signal (timing signal) BCMPO from the interrupt external input terminal INTP and supplies, to the processor core 5, a value counted up to the time when the interrupt signal BCMPO is inputted again. That is, the counter 6 supplies time information between the interrupt signals BCMPO to the processor core 5. As will be described in detail later, the processor core 5 grasps an interval of the time at which the counter electromotive voltage intersects with the midpoint potential COMMON from the supplied time information, changes the PWM control signals HIA to HIC and LIA to LIC to be generated, and switches the rotation speed of the three-phase BLDC motor 4.

The A/D conversion circuit 7 converts the selection voltage BAMPO from the analog external input terminal ADIN into a digital signal and supplies it to the processor core 5. The A/D conversion circuit 7 will be described later in a fourth embodiment, and so the further description thereof will be omitted.

<<Gate Drive Semiconductor Device 2, Driver 3, and Three-Phase BLDC Motor 4>>

The gate drive semiconductor device 2 is not particularly limited, but is composed of one semiconductor device, and includes a control logic unit (Control Logic) 8, a sense unit (Sense Block) 9, and a buffer 10. Further, the gate drive semiconductor device 2 includes first to sixth external terminals provided on the semiconductor device.

Here, the first external terminal is input external terminals T1HA to T1HC and T1LA to T1LC to which the PWM control signals HIA to HIC and LIA to LIC are supplied from the processor 1. The second external terminal is output external terminals T2HA, T2LA to T2HC, and T2LC that supply a drive signal from the gate drive semiconductor device 2 to the driver 3. The third external terminal is input external terminals T3A to T3C to which a counter electromotive voltage is supplied from the driver 3. In addition, the fourth external terminal is an output external terminal T4 for supplying the interrupt signal BCMPO to the processor 1, and the fifth external terminal is an output external terminal T5 for supplying the selection voltage BAMPO, which is an analog signal, to the processor 1. Further, the sixth external terminal is an input external terminal T6 to which the midpoint potential COMMON is supplied from the three-phase BLDC motor 4.

Among the PWM control signals HIA to HIC and LIA to LIC outputted by the processor 1, the PWM control signals HIA and LIA are PWM control signals corresponding to a phase A of the three-phase BLDC motor 4, the PWM control signals HIB and LIB are PWM control signals corresponding to a phase B of the three-phase BLDC motor 4, and the PWM control signals HIC and LIC are PWM control signals corresponding to a phase C of the three-phase BLDC motor 4.

The control logic unit 8 forms internal drive signals ID_A to ID_C based on the PWM control signals HIA to HIC and LIA to LIC supplied to the external terminals T1HA to T1HC and T1LA to T1LC, and supplies them to the buffer 10. That is, the control logic unit 8 forms the internal drive signal ID_A based on the PWM control signals HIA and LIA, forms the internal drive signal ID B based on the PWM control signals HIB and LIB, and forms the internal drive signal ID_C based on the PWM control signals HIC and LIC.

The buffer 10 includes a unit buffer circuit DHA corresponding to the phase A, a unit buffer circuit DHB corresponding to the phase B, and a unit buffer circuit DHC corresponding to the phase C. The unit buffer circuits DHA to DHC mutually have almost the same configuration. Taking the unit buffer circuit DHA as an example, the unit buffer circuit includes two buffers (HS, LS) 19 and 20. The unit buffer circuit DHA corresponds to the phase A of the three-phase BLDC motor 4, and the buffers 19 and 20 in the unit buffer circuit DHA form drive signals HOA and *LOA* in accordance with the corresponding internal drive signal ID_A, and supplies them to external terminals T2HA and T2LA which are the second external terminals. Further, the voltage HSA from the corresponding phase A in the three-phase BLDC motor 4 is supplied to the buffer 10 via an external terminal T3A which is the third external terminal. This voltage HSA is outputted from the buffer 10 to the sense unit 9. Since the unit buffer circuits DHB and DHC are also the same as the unit buffer circuits DHA, the description thereof will be omitted.

The driver 3 is not particularly limited, but is connected in parallel between a power supply voltage VM and a ground voltage GND, and includes three arms ARM_A to ARM_C corresponding to the respective phases of the three-phase BLDC motor 4. Since the arms ARM_A to ARM_C mutually have almost the same configuration, the arm ARM_A will be described as an example.

The arm ARM_A includes an upper arm UAM_A and a lower arm DAM_A connected in series between the power supply voltage VM and the ground voltage GND. Each of the upper arm UAM_A and the lower arm DAM_A includes a diode DD connected in an opposite direction of an N-channel type MOSFET (field effect type transistor) NM. One end of the coil LA configuring the corresponding phase A is connected to a connection node nd_A between the upper arm UAM_A and the lower arm DAM_A. In addition, a drive signal HOA from the external terminal T2HA is supplied to a gate of the MOSFET NM of the upper arm UAM_A, and a drive signal LOA from the external terminal T2LA is supplied to a gate of the MOSFET NM of the lower arm DAM_A. Further, the connection node nd_A is connected to the external terminal T3A.

The arm ARM_B is different from the arm ARM_A in that a connection node nd_B is connected to one end of the coil LB configuring the corresponding phase B and is connected to the external terminals T2HB, T2LB and T3B. Similarly, the arm ARM_C is different from the arm ARM_A in that a connection node nd_C is connected to one end of the coil LC configuring the corresponding phase C and is connected to the external terminals T2HC, T2LC and T3C.

The three-phase BLDC motor 4 includes coils LA to LC corresponding to the respective phases as described above with reference to FIG. 9. Here, the coil LA corresponds to the phase A, the coil LB corresponds to the phase B, and the coil LC corresponds to the phase C. As described above, the one ends of the coils LA to LC are respectively connected to the connection nodes nd_A to nd_C, and each of the other ends thereof are connected to a midpoint CMN. In the first embodiment, the midpoint CMN is connected to the external terminal T6 of the gate drive semiconductor device 2, and a midpoint potential COMMON of the three-phase BLDC motor 4 is supplied from the midpoint CMN to the external terminal T6.

When the MOSFET NM in the driver 3 is turned on (becomes an on-state) in accordance with the PWM control signals HIA to HIC and LIA to LIC, for example, a current flows through the coil LA and the coil LC, a magnetic field is generated, and the rotor (not shown) rotates. At this time, for example, a counter electromotive voltage is generated in the coil LB. At this time, a voltage HSB, which is a voltage obtained by adding a counter electromotive voltage to the midpoint potential COMMON, appears at the external terminal T3B. The voltage HSB is supplied to the sense unit 9 in the gate drive semiconductor device 2, and the midpoint potential COMMON is also supplied to the sense unit 9 via the external terminal T6. A comparison circuit 18 detects an intersection (zero cross) by comparing the voltage HSB and the midpoint potential COMMON.

In the first embodiment, the sense unit 9 has a function of estimating the rotation period of the three-phase BLDC motor 4. Further, the control logic unit 8 includes a counter electromotive voltage detection control logic (hereinafter, also referred to as a control logic or a counter electromotive detection logic) 11 for determining the phase to be detected among the phases A to C.

<<<Counter Electromotive Detection Logic and Sense Unit>>>

The control logic unit 8 includes a counter electromotive detection logic 11 and a counter 12. Although being described in detail later with reference to the drawings, the counter electromotive detection logic 11 forms a sampling signal SMPEN and a counter electromotive phase selection signal BDETA to BDETC based on the PWM control signals HIA to HIC and LIA to LIC, and supplies them to the sense unit 9. A signal from a comparison circuit described later is supplied to the counter 12. Since this counter 12 is described in a third embodiment, its description will be omitted here.

The sense unit 9 includes a counter electromotive voltage multiplexer 13, sampling/hold circuits 15, 16 and 17, a comparison circuit 18, and an amplifier 14.

Voltages HSA to HSC are supplied from the buffer 10 to the counter electromotive voltage multiplexer 13, and the counter electromotive phase selection signals BDETA to BDETC are supplied from the counter electromotive detection logic 11 to the counter electromotive voltage multiplexer 13. The counter electromotive voltage multiplexer 13 selects and outputs a voltage corresponding to the phase specified by the counter electromotive phase selection signals BDETA to BDETC from the voltages HSA to HSC.

The sampling signal SMPEN and the voltage selected by the counter electromotive voltage multiplexer 13 are supplied to the sampling/hold circuit 16, and the sampling signal SMPEN and the midpoint potential COMMON are supplied to the sampling/hold circuit 17. The sampling/hold circuit 16 samples and holds the voltage selected by the counter electromotive voltage multiplexer 13 in response to a change in the sampling signal SMPEN. Meanwhile, the sampling/hold circuit 17 samples and holds the midpoint potential COMMON in response to a change in the sampling signal SMPEN.

The voltage held by the sampling/hold circuit 16 and the midpoint potential COMMON held by the sampling/hold circuit 17 are supplied to the comparison circuit 18. The comparison circuit 18 compares the voltage held by the sampling/hold circuit 16 with the midpoint potential COMMON and outputs, as an interrupt signal BCMPO, a comparison result to the external terminal T4. The signal held by the sampling/hold circuits 16 and 17 is an analog signal, but the interrupt signal BCMPO becomes a binary digital signal by the above comparison. Further, since the interrupt signal BCMPO changes when the counter electromotive voltage from the sampling/hold circuit 16 intersects with the midpoint potential COMMON, the interrupt signal BCMPO represents timing of the intersection (zero cross).

The amplifier 14 amplifies the counter electromotive voltage selected by the counter electromotive voltage multiplexer 13 and supplies it to the sampling/hold circuit 15. The counter electromotive voltage held by the sampling/hold circuit 15 is supplied to the external terminal T5 and is supplied as the selection voltage BAMPO to the processor 1. Since the amplifier 14 and the sampling/hold circuit 15 are described later in a fourth embodiment, they will not be described further here.

As described above, although circuit blocks for explanation in other embodiments are also drawn in FIG. 1, needless to say, these circuit blocks may not be present in the motor driving system 100 according to the first embodiment.

When the processor 1 changes, for example, the rotation speed of the three-phase BLDC motor 4, it changes the PWM control signals HIA to HIC and LIA to LIC. In this case, the processor 1 needs to know the current rotation speed of the three-phase BLDC motor 4 to be controlled. In using the counter electromotive voltage to detect the current rotation speed, the counter electromotive voltage needs to be detected at the appropriate timing and in the appropriate phase. Meanwhile, the PWM control signals HIA to HIC and LIA to LIC supplied from the processor 1 to the gate drive semiconductor device 2 include information on the driving phase in the three-phase BLDC motor 4 and on the PWM operation.

In the first embodiment, the counter electromotive detection logic 11 extracts the optimum timing for detecting the counter electromotive voltage and the signal for determining the phase for detecting the counter electromotive voltage, based on the information of the driving phase and the PWM operation included in the PWM control signals HIA to HIC and LIA to LIC. In FIG. 1, the signal indicating the optimum timing for detecting the counter electromotive voltage corresponds to the sampling signal SMPEN, and the signal for determining the phase for detecting the counter electromotive voltage corresponds to the counter electromotive phase selection signals BDETA to BDETC.

In the sense unit 9, the counter electromotive voltage multiplexer 13 appropriately selects and switches the voltage corresponding to the phase in which the counter electromotive voltage is detected in accordance with the counter electromotive phase selection signals BDETA to BDETC. Further, in synchronization with the PWM control, the sampling/hold circuits 16 and 17 sample and hold the switched voltage and the midpoint potential COMMON in response to the sampling signal SMPEN. By comparing the midpoint potential COMMON with the selected voltage by the comparison circuit 18, a detection signal indicating the intersection (zero cross) between the voltage and the midpoint potential COMMON is generated and converted into a digital interrupt signal BCMPO. This interrupt signal BCMPO is inputted to an interrupt external input terminal INTP of the processor 1.

The timing (edge) at which the interrupt signal BCMPO is switched is zero-cross timing, and the processor 1 counts the time between the edges of the interrupt signal BCMPO inputted to the interrupt external input terminal INTP by the counter 6, thereby, for example, making it possible to grasp the rotation speed of the three-phase BLDC motor without performing an arithmetic processing for the zero-cross detection that uses the A/D conversion circuit built in the processor 1.

<<<Counter Electromotive Detection Logic 11>>>

Figure 2:
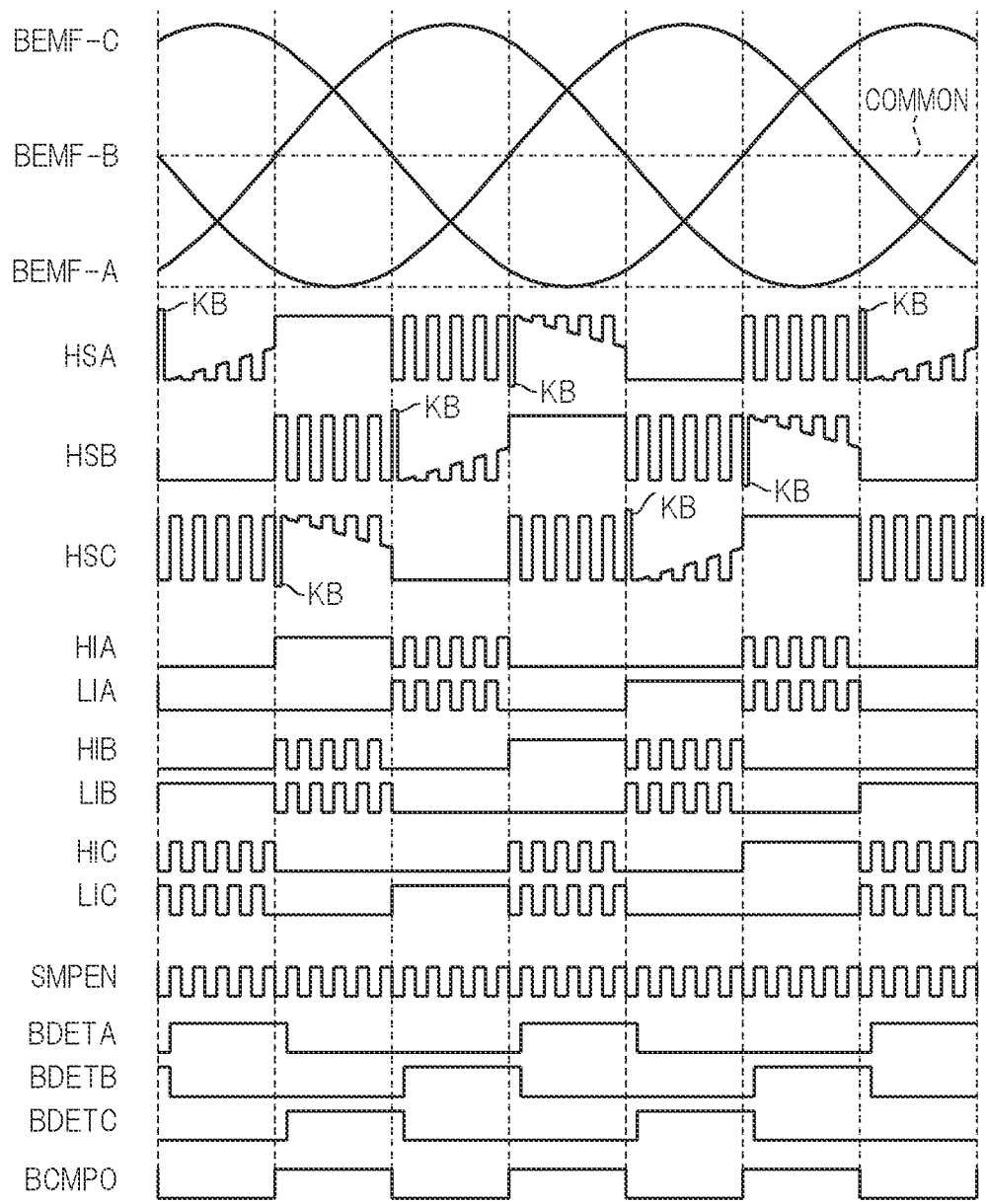
FIG. 2A is a view showing an operation of the motor driving system according to the first embodiment.
FIG. 2B is a view showing the operation of the motor driving system according to the first embodiment.

Next, the counter electromotive detection logic 11 will be described with reference to the drawings. FIG. 2 is a view showing an operation of the motor driving system 100 according to the first embodiment. FIG. 2A is a waveform diagram showing the operation of the motor driving system 100. Further, FIG. 2B is a chart (table) for explaining the counter electromotive detection logic 11.

In FIG. 2A, codes BEMF-A to BEMF-C indicate counter electromotive voltages generated in respective phases A to C of the three-phase BLDC motor 4. Here, the counter electromotive voltage BEMF-A indicates a counter electromotive voltage generated in the phase A, the counter electromotive voltage BEMF-B indicates a counter electromotive voltage generated in the phase B, and the counter electromotive voltage BEMF-C indicates a counter electromotive voltage generated in the phase C.

In addition, in FIG. 2A, codes HSA to HSC indicate voltages (drive voltage and counter electromotive voltage) appearing in the coils LA, LB, and LC of the respective phases A to C. In other words, the voltages HSA to HSC are voltages at the connection nodes nd_A to nd_C. Here, a voltage corresponding to the voltage supplied to the external terminal T3A (nd_A) is indicated by the voltage HSA, and a voltage corresponding to the voltage supplied to the external terminal T3C (nd_B) is indicated by the voltage HSB, and a voltage corresponding to the voltage supplied to the external terminal T3C (nd_C) is indicated by the voltage HSC.

In FIGS. 2A and 2B, the codes HIA to HIC and LIA to LIC indicate the PWM control signals supplied from the processor 1 to the gate drive semiconductor device 2 as described above, and the control logic unit 8 form internal drive signals ID_A to ID_C based on the PWM control signals HIA to HIC and LIA to LIC. Further, the counter electromotive detection logic 11 forms a sampling signal SMPEN and a counter electromotive phase selection signals BDETA to BDETC based on the PWM control signals HIA to HIC and LIA to LIC.

Here, the sampling signal SMPEN is a timing signal indicating the timing for detecting the counter electromotive voltage generated by the rotation of the three-phase BLDC motor 4. Further, the counter electromotive phase selection signals BDETA to BDETC are selection signals for designating the phase for detecting the counter electromotive voltage. At the timing indicated by the sampling signal SMPEN, the voltage in the phase specified (designated) by the counter electromotive phase selection signals BDETA to BDECC is compared with the midpoint potential COMMON, and the timing at which the voltage in the designated phase and the midpoint potential COMMON intersect is detected and notified to the processor 1 by the interrupt signal BCMPO. Incidentally, the voltage in the designated phase is the voltage obtained by adding the counter electromotive voltage to the midpoint potential COMMON.

In a case of the three-phase BLDC motor 4, the conditions for detecting the intersection of the voltage in the designated phase and the midpoint potential in the designated phase are roughly classified into the following six types. That is, the conditions are at a time of detecting a rise/fall of the counter electromotive voltage BEMF-A of the phase A, a time of detecting a rise/fall of the counter electromotive voltage BEMF-B of the phase B, and a time of detecting a rise/fall of the counter electromotive voltage BEMF-C of the phase C. These six states are shown in of the table of FIG. 2B as: a rising detection of the phase A (A rising edge); a falling detection of the phase C (C falling edge); a rising detection of the phase B (B rising edge); a falling detection of the phase A (A falling edge); a rising detection of the phase C (C rising edge); and a falling detection of the phase B (B falling edge). Further, the PWM control signals HIA to HIC and LIA to LIC for generating the six states, and the sampling signals SMPEN and the counter electromotive phase selection signals BDETA to BDETC in the six states are shown in FIG. 2B.

When being explained with reference to FIG. 2B, the timing of detecting the counter electromotive voltage is at a time when only one of the PWM control signals HIA to HIC is at a high level, or when only one of the PWM control signals LIA to LIC is at a high level. In FIG. 2B, the high level is indicated by the sign Hi and the low level is indicated by the sign Lo, but the underlined signs Hi and Lo indicate the timing of detecting the counter electromotive voltage.

For example, when the time of the rising detection of the phase A (A rising edge) is explained, a period during the PWM control signal HIC at the high level (Hi) and a period during the PWM control signals HIA and HIB at the low levels (Lo) become the timing of detecting the counter electromotive voltage. Incidentally, in this period (A rising edge), in order to connect the phase B to the ground voltage GND and the phase C to the power supply voltage VM, the PWM control signal HIC changes from the low level to the high level, and the PWM control signal LIC changes from the high level to the low level. Therefore, the timing for detecting the counter electromotive voltage is the period during which the PWM control signal HIC is at the high level. Similarly to the above, the remaining five states also make it possible to determine the timing for detecting the counter electromotive voltage based on a state of the voltage of the PWM control signal supplied from the processor 1.

Further, the phase for detecting the counter electromotive voltage can also be specified by the PWM control signals HIA to HIC and LIA to LIC. In order to detect the counter electromotive voltage, no power needs to be supplied to the target phase. That is, identifying a phase of a non-energized state (high impedance state), in which no power is supplied from the driver 3, among the phases A to C makes it possible to identify the phase for detecting the counter electromotive voltage. In the first embodiment, the upper arms UAM_A to UMA_C and the lower arms DAM_A to DAM_C that configure the driver 3 are composed of N-channel type MOSFETs NM.

Therefore, when both the PWM control signals HIA and LIA are at the low levels, the driven phase A becomes the non-energized state; when both the PWM control signals HIB and the LIB are at the low levels, the driven phase B becomes the non-energized state; and when both the PWM control signals HIC and LIC are at the low levels, the phase C becomes the non-energized state. In FIG. 2B, a state where both of the PWM control signals driving the respective phases are at the low levels is filled with dots to clearly indicate the state. In this way, the phase for detecting the counter electromotive voltage can also be identified by the PWM control signals HIA to HIC and LIA to LIC.

Figure 3:
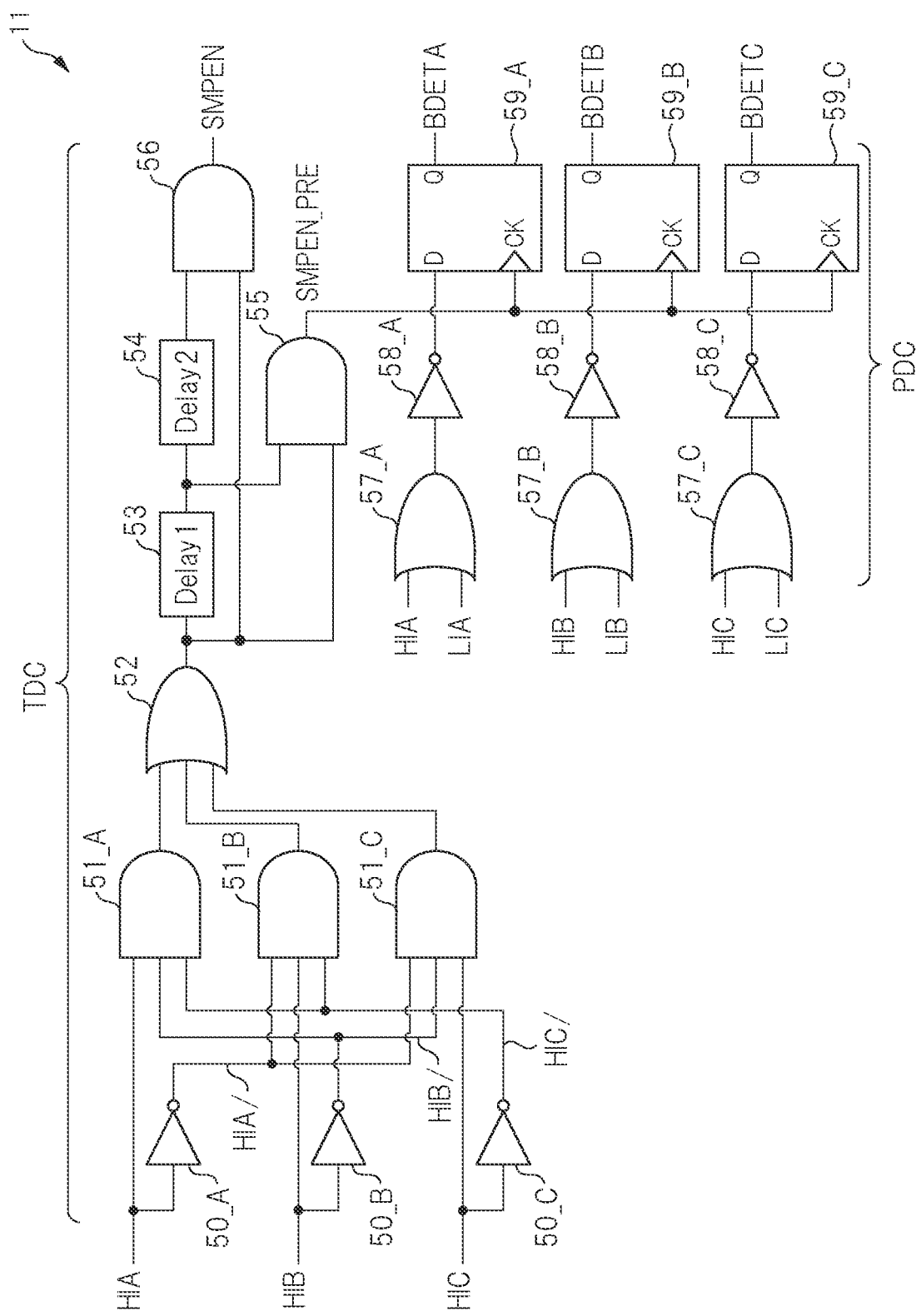
FIG. 3 is a block diagram showing a configuration of a counter electromotive detection logic according to the first embodiment.

In this way, based on the PWM control signals HIA to HIC and LIA to LIC supplied from the processor 1, formed can be a sampling signal indicating the timing for detecting the counter electromotive voltage and a counter electromotive phase selection signal for specifying the phase for detecting the counter electromotive voltage. Next, an example of the counter electromotive detection logic 11, which forms the sampling signal SMPEN indicating the timing for detecting the counter electromotive voltage and the counter electromotive phase selection signals BDETA to BDETC for specifying the phase for detecting the counter electromotive voltage, will be explained with reference to the drawings. FIG. 3 is a block diagram showing a configuration of the counter electromotive detection logic according to the first embodiment.

The counter electromotive detection logic 11 includes: inverter circuits 50_A to 50_C and 58_A to 58_C; AND circuits 51_A to 51_C, 55, and 56; OR circuits 52, 57_A to 57_C; delay (Delay) circuits 53, 54; and flip-flop circuits 59_A to 59_C.

The PWM control signals HIA to HIC are supplied from the processor 1 to the inverter circuits 50_A to 50_C and the AND circuits 51_A to 51_C. The inverter circuits 50_A to 50_C phase-invert the PWM control signals HIA to HIC, and output the inverted PWM control signals HIA/ to HIC/. Taking the PWM control signal HIA as an example, the corresponding PWM control signal HIA and the inverted PWM control signals HIB/and HIC/are supplied to the AND circuit 51_A corresponding to this PWM control signal. Similarly, the corresponding PWM control signal and the inverted PWM control signal of the non-corresponding PWM control signal are supplied to the AND circuits 51_B and 51_C. Outputs of the AND circuits 51_A to 51_C are supplied to the OR circuit 52. An output of the OR circuit 52 is supplied to the AND circuit 56 via two delay circuits 53 and 54 connected in series, and is directly supplied to the AND circuit 56. An output of the AND circuit 56 is supplied as a sampling signal SMPEN to the sampling/hold circuits 16 and 17 in the sense unit 9.

The output of the OR circuit 52 is represented by the logical formula:

HIA·HIB/·HIC/+HIA/·HIB·HIC/+HIA/·HIB/·HIC.

Here, the sign "·" indicates a logical product (and), and "+" indicates a logical sum (or). As can be understood from this formula, the OR circuit 52 leads to outputting the high level when one of the PWM control signals HIA to HIC becomes the high level. The output of the OR circuit 52 may be used as the sampling signal SMPN, but the first embodiment is provided with the delay circuits 53 and 54 and the AND circuit 56 so that a ringing portion of the motor drive voltage is not used for the intersection determination with the midpoint potential COMMON due to the PWM operation, thereby optimizing the sampling signal SMPEN.

The corresponding PWM control signals HIA, LIA to HIC, and LIC are supplied to the OR circuits 57_A to 57_C. The outputs of the OR circuits 57_A to 57_C are supplied to inputs D of the corresponding flip-flop circuits 59_A to 59_C via the inverter circuits 58_A to 58_C. In addition, the output of the OR circuit 52 and the output of the delay circuit 53 are supplied to the AND circuit 55. As a result, the AND circuit 55 forms a pre-sampling signal SMPEN PRE changed to a high level when the output of the OR circuit 52 and the output of the delay circuit 53 become high levels. This pre-sampling signal SMPEN PRE is supplied to clock terminals CK of the flip-flop circuits 59_A to 59_C. incidentally, the output of the OR circuit 52 may be used as the pre-sampling signal SMPENPRE. Further, the delay circuit 53 and the AND circuit 55 may be provided between the output of the OR circuit 52 and each of the inputs of the flip flop circuits 59_A to 59_C. The counter electromotive phase selection signals BDETA to BDTC are generated by using the PWM control signals HIA, HIB and HIC similarly to the pre-sampling signal SMPEN PRE. However, depending on a circuit configuration and layout, a change in each of the inverter circuits 58_A to 58_C may be slower than the generation of the pre-sampling signal SMPENPRE. In that case, erroneous data may be taken into the flip-flop circuits 59_A to 59_C. By providing the delay circuit 53 and the AND circuit 55 to the output of the OR circuit 52, the output of the pre-sampling signal SMPENPRE can be generated later than the output of the inverter circuits 58_A to 58_C even if the change in each of the inverter circuits 58_A to 58_C is delayed. This makes it possible to prevent the erroneous data from being taken into the flip-flop circuits 59_A to 59_C by mistake.

As a result, only the OR circuit, to which the PWM control signals having the low levels are supplied, among the PWM control signals HIA, LIA to HIC, and LIC outputs the low level, and the high level leads to being outputted from the corresponding inverter circuit. Therefore, when the pre-sampling signal SMPENPRE is changed to a high level, only the flip-flop circuit to the input D of which the high level is supplied leads to outputting the high-level counter electromotive phase selection signal. For example, when both the PWM control signals HIA and LIA are at low levels, the output of the inverter circuit 58_A becomes high level and when the pre-sampling signal SMPEN PRE is changed to the high level, the flip-flop circuit 59_A takes in and retains the high level from the inverter circuit 58_A.

As a result, the change in the PWM control signal due to the PWM operation is removed, and the counter electromotive phase selection signal BDETA with the high level continues to be outputted from the flip-flop circuit 59_A. At this time, the counter electromotive phase selection signals BDETB and BDETC with the low levels continue to be outputted from the remaining flip-flop circuits 59_B and 59_C. That is, the counter electromotive phase selection signals BDETA to BDETC are outputted as signals from which the change due to the PWM operation has been removed.

The PWM control signals HIA to HIC and LIA to LIC supplied from the processor 1 are signals in which the drive phase of the three-phase BLDC motor and the information on the PWM operation are mixed. However, the gate drive semiconductor device 2 according to the first embodiment can extract the timing for detecting the counter electromotive voltage and the information for specifying the phase for detecting the counter electromotive voltage from the PWM control signals HIA to HIC and LIA to LIC by the counter electromotive detection logic 11. That is, even if the processor does not form a special control signal, the gate drive semiconductor device 2 can form a signal for specifying the timing for detecting the counter electromotive voltage and a signal for specifying the phase for detecting the counter electromotive voltage.

In addition, the gate drive semiconductor device 2 forms a signal for specifying the timing for detecting the counter electromotive voltage and the phase for detecting the counter electromotive voltage, determines the intersection (zero-cross determination) of the voltage corresponding to the specified phase and the midpoint potential COMMON in the gate drive semiconductor device 2, thereby making it possible to notify the processor 1 of the timing of the intersection by, for example, an interrupt signal. As a result, the processor does not require the A/D conversion circuit for the zero-cross determination, and does not require the arithmetic processing using this A/D conversion circuit, either.

A zero-cross determination unit ZCD (FIG. 1) can be considered to be configured by the sense unit 9 and counter electromotive detection logic 11 described above. In this case, the zero-cross determination unit ZCD generates the interrupt signal BCMPO indicating the timing at which the counter electromotive voltage intersects with the midpoint potential COMMON of the three-phase BLDC motor 4 based on the PWM control signal and the counter electromotive voltage.

In addition, as shown in FIG. 3, the counter electromotive detection logic 11 can be considered to include a timing extraction circuit TDC and a phase detection circuit PDC. In this case, the timing extraction circuit TDC includes: inverter circuits 50_A to 50_C; AND circuits 51_A to 51_C, 56; an OR circuit 52; and delay circuits 53, 54, and extracts the timing for detecting the counter electromotive voltage. Further, the phase detection circuit PDC includes: flip-flop circuits 59_A to 59_C to which the pre-sampling signal SMPEN PRE is supplied; inverter circuits 58_A to 58_C; and AND circuits 57_A to 57_C, and extracts the phase for detecting the counter electromotive voltage based on the PWM control signal.

According to the first embodiment, the arithmetic processing for the zero-cross determination in the processor 1 can be reduced. By reducing this arithmetic processing, a delay time for switching the motor driving phase is reduced, and the motor can be controlled at higher-speed rotation.

Second Embodiment

In a second embodiment, provided is a motor driving system capable of rotating the motor at high speed while a through current in the driver 3 is reduced.

When the states of the upper arm and the lower arm connected in series and configuring the driver 3 are switched, the upper arm and the lower arm are turned on at the same time at the moment of switching and the through current flows between the power supply voltage VM and the ground voltage. As described with reference to FIG. 1, for example, when the N-channel type MOSFET configuring the upper arm UAM_A and the N-channel type MOSFET configuring the lower arm DAM_A are switched from the ON/OFF states to the OFF/ON states, both the N-channel type MOSFETs are momentarily turned in switching them and the through current may flow through these N-channel type MOSFETs.

In order to prevent the through current from flowing, in the motor driving system according to the second embodiment, both the N-channel type MOSFETs configuring the upper arm and the lower arm that are connected in series are controlled so as to sandwich a period of time when both are in the OFF states in switching them. However, in a case of performing such control, it has been found by the study of the present inventors that a method for determining the configuration described in the first embodiment is insufficient.

Next, a specific example of the motor driving system according to the second embodiment will be described with reference to the drawings. A configuration of the motor driving system according to the second embodiment is similar to the configuration of the motor driving system shown in FIG. 1. A difference therebetween is that when the states of the upper arm and the lower arm are switched, the driver 3 is controlled so as to sandwich a period time when both become the OFF states, and that the counter electromotive detection logic 11 is constitutively changed and becomes a counter electromotive detection logic 11A.

Figure 5:
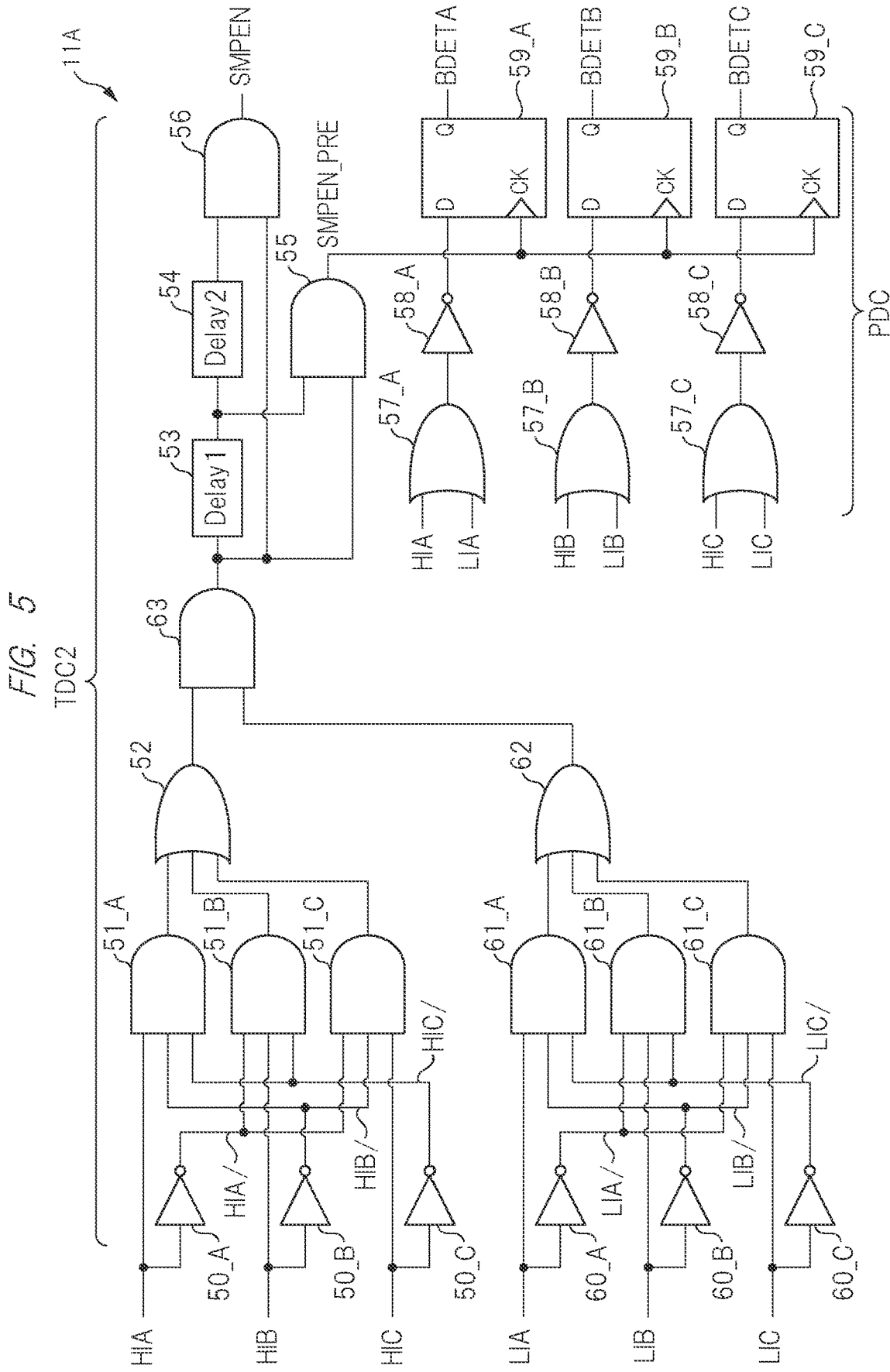
FIG. 5 is a block diagram showing a configuration of the counter electromotive detection logic according to the second embodiment.

FIG. 4 is a diagram for explaining an operation of a counter electromotive detection logic according to the second embodiment. In addition, FIG. 5 is a block diagram showing a configuration of the counter electromotive detection logic according to the second embodiment. Incidentally, the overall configuration of the motor driving system according to the second embodiment is the same as the configuration shown in FIG. 1.

FIG. 4 is similar to FIG. 2B. A difference therebetween is that a part of the PWM control signal supplied to the counter electromotive detection logic is changed and the sampling signal SMPEN is changed.

The states of the upper arm and the lower arm can be switched in accordance with the PWM control signal. In FIG. 4, for example, when the rising detection in the phase A (A rising edge) is described as an example, changes in the voltages of the PWM control signals HIC and LIC corresponding to the phase C bring switching the states of the upper arm UAM_C and the lower arm DAM_C that correspond to the phase C shown in FIG. 1. That is, in a case of the rising detection in the phase A, the PWM control signal HIC is changed from the low level to the high level. At this time, the PWM control signal LIC is changed from the high level to the low level. As a result, the end of the coil LC corresponding to the phase C connected to the ground voltage GND via the lower arm DAM_C is connected to the power supply voltage VM via the upper arm UAM_C. At this time, the through current may flow momentarily as described above. In order to prevent this, as shown in FIG. 4, each of the PWM control signals HIC and LIC is provided with a period of time when the PWM control signals HIC and LIC become low levels (Lo) at the same time in switching the voltage. This brings preventing the upper arm UAM_C and the lower arm DAM_C from becoming the ON states at the same time, and the through current is prevented.

However, when the timing for detecting the counter electromotive voltage is extracted from the PWM control signal, the counter electromotive detection logic 11 described in the first embodiment may not be able to extract the timing. For example, in FIG. 4, in a case of the falling detection in the phase C (C falling edge), the low-level timing that has been added to prevent the through current from flowing leads to being extracted simultaneously as the timing for detecting the counter electromotive voltage if the timing for detecting the counter electromotive voltage is extracted only by the PWM control signals HIA, HIB and HIC. At the low-level timing added to prevent this through current from flowing, the voltages of both the phase A and phase B become the power supply voltages, and when the zero cross of the counter electromotive voltage is detected at this timing, the midpoint potential COMMON becomes stuck to the power supply voltage. Therefore, no correspondence by a voltage input range of the comparison circuit 18 shown in FIG. 1 leads to causing erroneous determination.

In the second embodiment, attention is paid to all of the PWM control signals HIA to HIC and LIA to LIC supplied from the processor 1, and the timing when these PWM control signals become predetermined states is set as the timing of detecting the counter electromotive voltage. That is, cases where only one of the PWM control signals HIA to HIC becomes the high level and only one of the PWM control signals LIA to LIC becomes the high level are set as the timing of detecting the counter electromotive voltage. As shown in FIG. 4, this makes it possible to remove the low-level timing added to prevent the through current from the timing of detecting the counter electromotive voltage.

Next, in the second embodiment, an example of the counter electromotive detection logic 11A forming the sampling signal SMPEN and the counter electromotive phase selection signals BDETA to BDETC will be described with reference to FIG. 5.

FIG. 5 is similar to FIG. 3. A difference therebetween is that the inverter circuits 60_A to 60_C, the AND circuits 61_A to 61_C, 63, and the OR circuit 62 are added. The inverter circuits 60_A to 60_C, the AND circuits 61_A to 61_C, and the OR circuit 62 are connected to one another so as to have a similar configuration to the inverter circuits 50_A to 50_C, the AND circuits 51_A to 51_C, and the OR circuit 52 that have been described in FIG. 3. However, the PWM control signals LIA to LIC are supplied to the inverter circuits 60_A to 60_C, and the inverter circuits 60_A to 60_C output the inverted PWM control signals LIA/ to LIC/. Further, the PWM control signals LIA to LIC and the inverted PWM control signals LIA/to LIC/ are supplied to the AND circuits 61_A to 61_C.

The outputs of the OR circuit 52 and the OR circuit 62 is supplied to the AND circuit 63, and the output of the AND circuit 63 is supplied to the delay circuit 53 and the AND circuit 55. That is, in FIG. 3, the output of the OR circuit 52 is supplied to the delay circuit 53 and the AND circuit 55, but in the count electromotive detection logic 11A, the output of the added AND circuit 63 is supplied to the delay circuit 53 and the AND circuit 55.

This output of the AND circuit 63 is represented by a logical formula (HIA·HIB/·HIC/+HIA/·HIB·HIC/+HIA/·HIB/·HIC)·(LIA·LIB/·LIC/+LIA/·LIB·LIC/+LIA/·LIB/·LIC). As can be understood from this formula, the AND circuit 63 outputs the high level when only one of the PWM control signals HIA to HIC becomes the high level and only one of the PWM control signals LIA to LIC becomes the high level.

That is, when only one of the PWM control signals HIA to HIC becomes the high level and only one of the PWM control signals LIA to LIC becomes the high level, the sampling signal SMPEN becomes the high level. This timing is the timing of detecting the counter electromotive voltage. Further, similarly to FIG. 3, the flip-flop circuits 59_A to 59_C hold and output the counter electromotive phase selection signals BDETA to BDETC when the presampling signal SMPEN PRE is changed to the high level.

The motor driving system according to the second embodiment makes it possible to rotate the motor at the high speed while reducing the through current.

A timing extraction circuit TDC2 according to the second embodiment can be considered as addition of the logic circuit to the timing extraction circuit TDC described in the first embodiment, the logic circuit excluding a period of keeping the same potential for phase-switching from the timing of detecting the counter electromotive voltage.

Third Embodiment

At the timing of switching the drive phase of the three-phase BLDC motor 4, a kickback voltage is generated in the coils LA to LC (FIG. 1) of the motor. It is difficult to detect the counter electromotive voltage during the period when the kickback voltage is generated. In the third embodiment, a function of avoiding an influence of the kickback voltage is added to the motor driving system described in the first or second embodiment.

First, a kickback operation for generating a kickback voltage will be described. FIG. 6 is a diagram for explaining the kickback operation. Here, FIG. 6A shows the states of the driver 3 and the three-phase BLDC motor 4 at the time of the falling detection in the phase C (C falling edge). In addition, FIG. 6B shows the states of the driver 3 and the three-phase BLDC motor 4 at the time of the rising detection of in phase B (B rising edge) following the falling detection in the phase C shown in FIG. 6A. Further, FIG. 6C shows a waveform of the kickback voltage generated when the drive phase is switched, in other words, when the detection phase is switched.

When the falling detection in the phase C is performed, a current is flowing from the phase A to the phase B. In this state, as shown in FIG. 6A, the N-channel type MOSFET (hereinafter, also referred to as a high-side transistor) UNM configuring the upper arm UAM_A becomes the ON state by the drive signal HOA, and the N-channel type MOSFET (hereinafter, also referred to as a low-side transistor) DNM configuring the lower arm DAM_A becomes the OFF state by the drive signal LOA. As a result, a voltage HSA at the connection node nd_A becomes a power supply voltage VM-Ronh*Iab when ON-resistance of the high-side transistor UNM is Ronh and a drive current flowing through the high-side transistor UNM is Iab.

At this time, the low-side transistor DNM configuring the lower arm DAM_B becomes an ON state by a drive signal LOB, and the high-side transistor UNM configuring the upper arm UAMB becomes an OFF state by a drive signal HOB. As a result, a voltage HSB at the connection node nd_B becomes the ground voltage GND+Ronl*Iab when ON-resistance of the low-side transistor DNM is Ronl. That is, a drive voltage is applied to the coils LA and LB configuring the phases A and B, the drive current Iab flows through the coils LA and LB, which brings generation of a magnetic field. At this time, no drive voltage is applied to both ends of the coil LC configuring the phase C so as to generate a counter electromotive voltage, the coil LC is in a high impedance state, and no drive current flows through the coil LC.

The state of the falling detection in the phase C is changed to the state of the rising detection in the phase B. That is, the driver 3 is switched from the state of FIG. 6A to the state of FIG. 6B. In FIG. 6B, in order to detect the counter electromotive voltage in the coil LB of the phase B, the low-side transistor DNM of the lower arm DAM_B corresponding to the phase B is made the OFF state, and the coil LB is switched to the high impedance state. Further, the low-side transistor DNM of the lower arm corresponding to the phase C is switched to the ON state so that the drive current flows through the coils LA and LC.

However, as described above, even after the low-side transistor DNM of the lower arm DAM_B is made the OFF state and the coil LB is switched to the high impedance state, the coil LB operates so as to continue flowing the drive current Iab. As a result, the voltage HSB at the connection node nd_B rises as shown in FIG. 6C, and rises up to a forward voltage Vf of the power supply voltage VM+diode (body diode of the high-side transistor UNM) DD. At this time, using the phase B to detect the counter electromotive voltage causes erroneous detection. That is, the kickback voltage KB is generated during a period until the current flowing through the coil LB disappears due to the action of the coil LB, and the counter electromotive voltage cannot be detected by using the phase B.

Here, a case of switching from the falling detection in the phase C to the rising detection in the phase B has been described as an example, but when each phase is switched as shown in FIG. 2, the kickback voltage KB is similarly generated.

In the third embodiment, a mask signal is formed so that the counter electromotive voltage is not detected when the kickback voltage is generated, and a function of causing a detection start of the counter electromotive voltage to be delayed until the kickback voltage subsides (converges) is added to the motor driving system of the first or second embodiment.

In the motor driving system according to the third embodiment, as shown in FIG. 1, the control logic unit 8 includes a counter 12. As shown in FIG. 1, the interrupt signal BCMPO is supplied to the counter 12 from the comparison circuit 18, and the counter 12 supplies the mask signal MASK (shown in FIG. 7 later) to the counter electromotive detection logic. The counter 12 starts counting by changing the interrupt signal BCMPO, and when counting only a value corresponding to a predetermined time, the counter 12 changes the mask signal MASK and returns its counted value to an initial value. Since the counter electromotive detection logic according to the third embodiment is changed from the counter electromotive detection logics 11 and 11A described in the first and second embodiments, the counter electromotive detection logic according to the third embodiment will be represented as the reference numeral 11B for convenience of explanation.

By using the counter electromotive detection logic 11 as an example, a difference between the counter electromotive detection logics 11 and 11B will be described. The counter electromotive detection logic 11B has a mask calculation circuit added to the counter electromotive detection logic 11. A sampling signal SMPEN and a mask signal MASK from the counter 12 are supplied to the mask calculation circuit, a logical operation is performed between the sampling signal SMPEN and the mask signal MASK, and a signal obtained by the logical operation is outputted as a sampling signal SMPEN2 that avoids an influence due to the kickback voltage. In the third embodiment, a sampling signal SMPEN2 is supplied to the sampling/hold circuits 16 and 17 instead of the sampling signal SMPEN.

Figure 7:
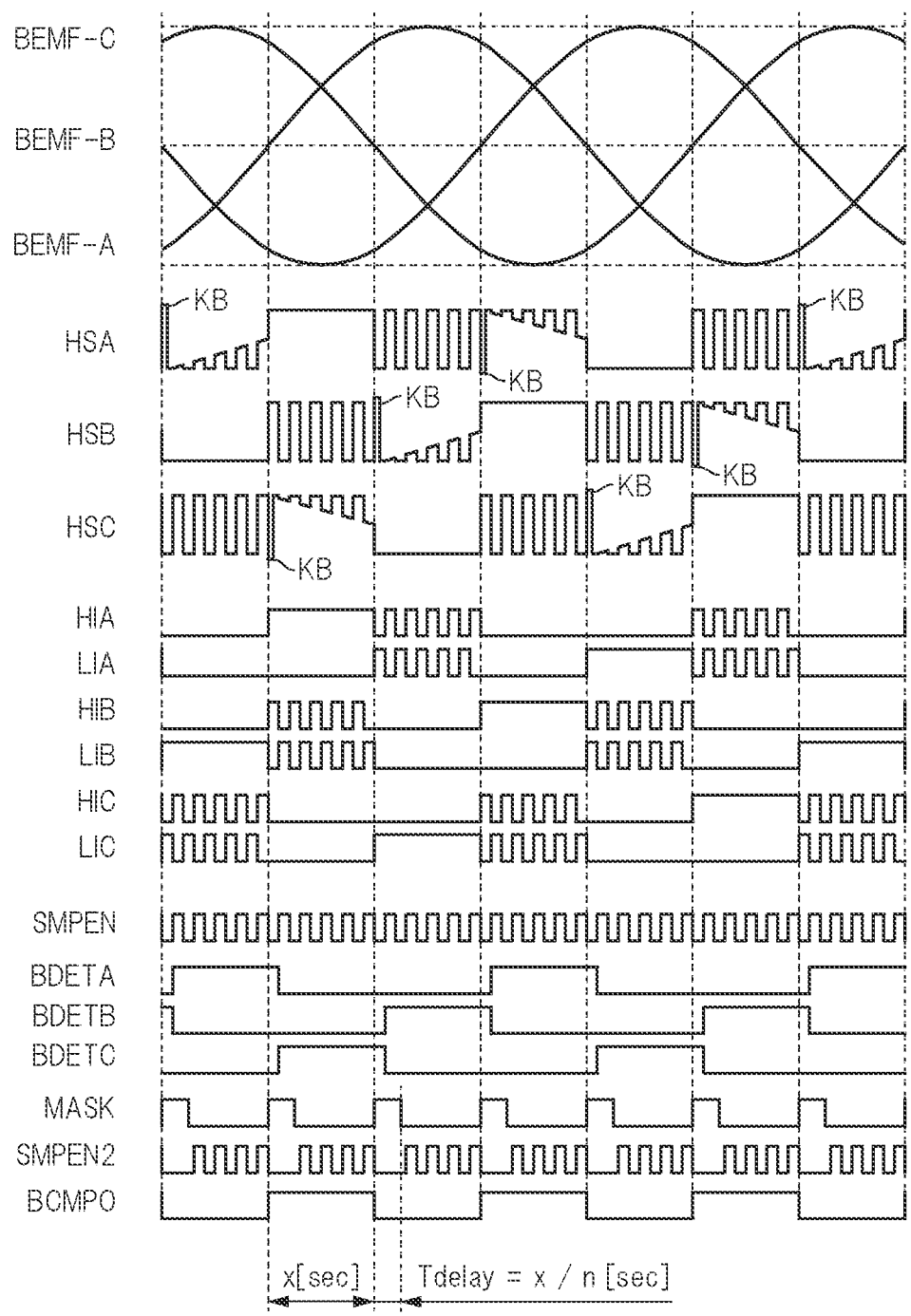
FIG. 7 is a waveform diagram showing an operation of a motor driving system according to a third embodiment.

Next, an operation of the third embodiment will be described with reference to the drawings. FIG. 7 is a waveform diagram showing the operation of the motor driving system according to the third embodiment. Since FIG. 7 is similar to FIG. 2, a difference therebetween will be mainly described.

The difference is that FIG. 7 adds the mask signal MASK and the sampling signal SMPEN2 to FIG. 2.

In the third embodiment, a mask release time for releasing a mask of the sampling signal SMPEN is set by using the rotation period of the three-phase BLDC motor 4. That is, a previous drive-phase switching time is saved as "x [sec]", and a mask release time Tdelay is estimated from this time x. Specifically, the held drive-phase switching time x is divided (x/n) by a desired variable n, and its divided result is defined as the mask release time Tdelay. This mask release time Tdelay is set as a predetermined time in the counter 12 described above. Here, the variable n is a variable for optimizing the mask signal MASK, and is set based on the rotation number of the three-phase BLDC motor 4, a frequency of the PWM operation, and its duty (duty). Further, the mask release time by the mask signal MASK starts at the switching timing of the drive phase. That is, in response to the change in the interrupt signal BCMPO outputted from the comparison circuit 18, masking by the mask signal starts.

The counter 12 starts counting by switching the drive phase (change in interrupt signal BCMPO). As a result, the counter 12 changes the mask signal MASK to a high level and masks the sampling signal SMPEN. As a result, the sampling signal SMPEN2 supplied to the sampling/hold circuits 16 and 17 is fixed at the low level. When the counter 12 counts and reaches the mask release time Tdelay, the counter 12 makes the mask signal MASK at the low level. As a result, the sampling signal SMPEN is outputted as the sampling signal SMPEN2.

Consequently, the sampling/hold circuit 16 does not sample/hold the counter electromotive voltage from the counter electromotive voltage multiplexer 13 during the period when a kickback voltage KB is generated. Further, during this period, the sampling/hold circuit 17 does not sample/hold the midpoint potential COMMON, either. As a result, the erroneous detection of the counter electromotive voltage can be prevented from being generated due to the kickback voltage.

Incidentally, although not particularly limited, in the third embodiment, the processor 1 performs the saving of the previous drive-phase switching time x and the calculation of the mask release time Tdelay, and the processor 1 sets the mask release time Tdelay to the counter 12. Of course, the present invention is not limited to this, and the gate drive semiconductor device 2 may perform these operations.

The timing extraction circuit according to the third embodiment is considered as the addition of the logic circuit to the timing extraction circuit described in the first embodiment, the logic circuit excluding the period of occurrence of the kickback from the timing when the counter electromotive voltage is detected. Can be done. In this logic circuit, the mask signal MASK is formed, and making the sampling signal SMPEN a mask brings generating the sampling signal SMPEN2.

Fourth Embodiment

In the operation from starting of the three-phase BLDC motor to reaching of the high-speed rotation, a method of detecting the counter electromotive voltage is considered suitable as follows: for example, the A/D conversion circuit built in the processor 1 is used in a range of the low-speed rotation, and the configurations described in the first to third embodiments are used in a region of the high-speed rotation. A fourth embodiment provides a motor driving system capable of changing the configuration for detecting the counter electromotive voltage depending on the rotation number of the three-phase BLDC motor. In this way, by narrowing down the conditions (environment) for using the configurations described in the first to third embodiments, a more efficient configuration can be expected. For example, when the configuration described in the third embodiment is used only in the region of high-speed rotation, the gate drive semiconductor device 2 can be downsized. That is, in the third embodiment, the counter 12 needs to be provided in the gate drive semiconductor device 2, but when the configuration of the third embodiment is adopted only in the region of the high-speed rotation, reducing the number of stages of the counter 12 and downsizing the counter 12 make it possible to reduce a size of the gate drive semiconductor device 2.

In the fourth embodiment, as shown in FIG. 1, the amplifier 14, the sampling/hold circuit 15, and the external terminal T5 are provided in the gate drive semiconductor device 2. Further, the processor 1 is provided with an analog external input terminal ADIN and an A/D conversion circuit 7.

Figure 8:
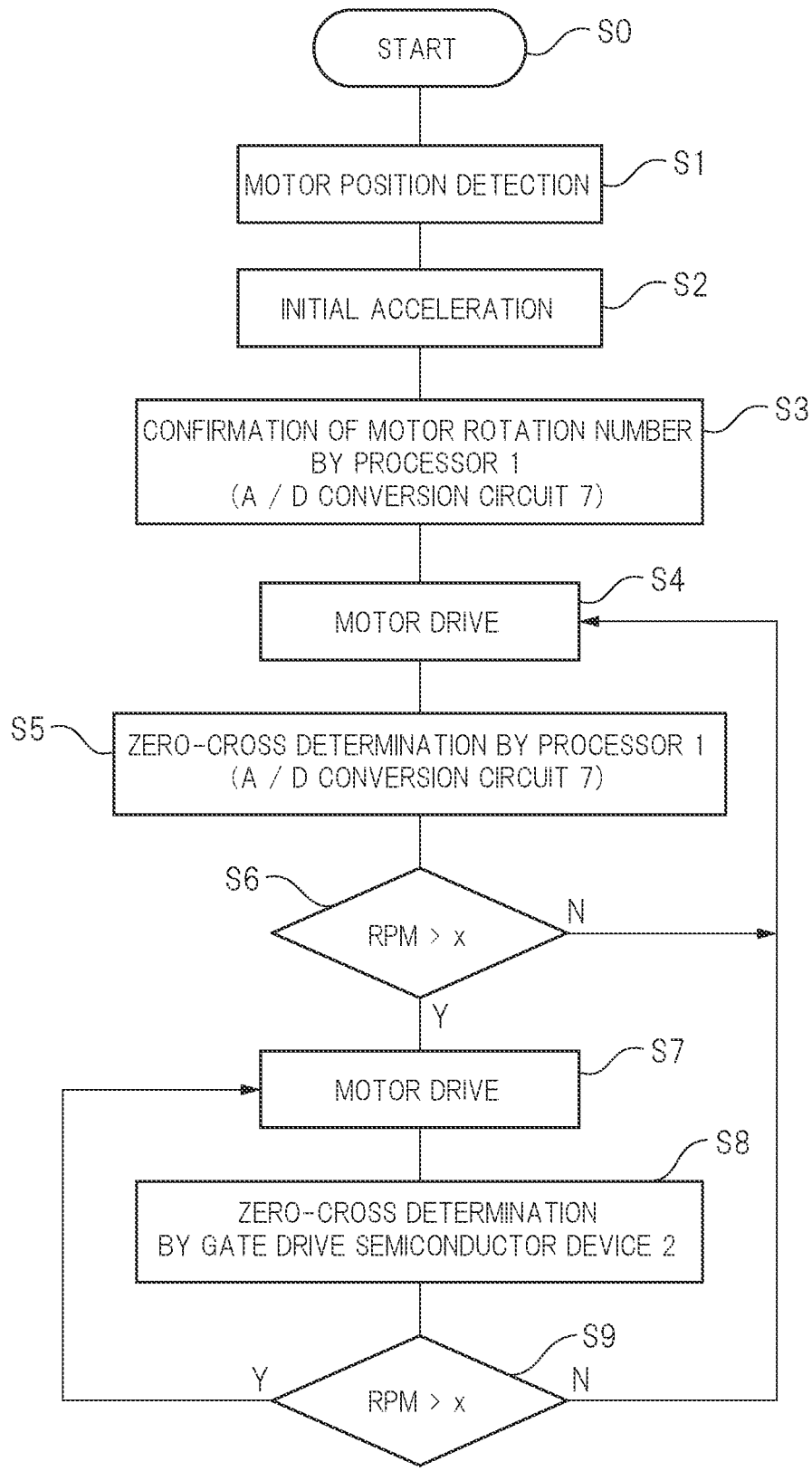
FIG. 8 is a flowchart showing an operation of a motor driving system according to a fourth embodiment.

Next, an operation of a motor driving system according to the fourth embodiment will be described with reference to the drawings. FIG. 8 is a flowchart showing an operation of a motor driving system according to the fourth embodiment. Here, a case where the three-phase BLDC motor 4 is started from a stopped state and is rotated at the high speed will be described.

First, in step S0, the operation is started (Start). Next, in step S1, a position of the phase of the three-phase BLDC motor is detected (motor position detection).

Initial acceleration is performed in step S2. That is, the three-phase BLDC motor 4 is initially accelerated under a condition(s) optimized for each motor driving system. In this initial acceleration, the counter electromotive voltage is not detected.

When the initial acceleration is completed, a rotation number of the BLDC motor is confirmed by the processor 1 (A/D conversion circuit 7) in step S3. In this step, in the gate drive semiconductor device 2, the counter electromotive voltage outputted from the counter electromotive voltage multiplexer 13 is amplified by the amplifier 14, and is sampled and held by the sampling/hold circuit 15. The held analog counter electromotive voltage is outputted as a selection voltage BAMPO to an analog external input terminal ADIN of the processor 1 via the external terminal T5. The selection voltage BAMPO is converted into a digital signal by the A/D conversion circuit 7, and is supplied to the processor core 5. The processor core 5 confirms the rotation number of the three-phase BLDC motor 4 based on the supplied counter electromotive voltage, and perform control in accordance with the confirmed rotation number in steps S4 and S5. The three-phase BLDC motor 4 is driven by the PWM operation in step S4, and the zero-cross determination is performed by the processor 1 (A/D conversion circuit 7) in step S5 to grasp the rotation number.

In step S6, it is determined whether or not a rotation number PRM grasped in step S5 has reached a predetermined rotation number x (rpm). If the rotation number RPM has not reached the predetermined rotation number x, its process returns to step S4 and the rotation number is increased by the PWM operation.

When the rotation number RPM has reached the predetermined rotation number x, the three-phase BLDC motor 4 is driven by PWM drive in step S7 and the zero-cross determination is performed by the gate drive semiconductor device 2 in step S8. In this case, as described in the first embodiment and the like, in the gate drive semiconductor device 2, the counter electromotive voltage and the midpoint potential COMMON are compared, the zero-cross determination is performed, and the processor 1 is notified of its determination result as an interrupt signal BCMPO.

The processor 1 confirms the rotation number of the three-phase BLDC motor 4 based on the interrupt signal BCMPO. In step S9, it is determined whether or not the confirmed rotation number RPM has reached the predetermined rotation number x. If the confirmed rotation number RPM has reached the predetermined rotation number x, its process returns to step S7 and if the confirmed rotation number RPM has not reached the predetermined rotation number x, its process returns to step S4.

In the fourth embodiment, the high-speed rotation region and the low-speed rotation region are identified with the predetermined rotation number x as a boundary. That is, where the rotation number of the three-phase BLDC motor 4 is lower than the predetermined rotation number x is defined as a low-speed rotation region, and where the rotation number is higher than the predetermined rotation number x is defined as a high-speed rotation region. This predetermined rotation number x may be determined in accordance with specifications and circuit design of the three-phase BLDC motor and the motor driving system.

Further, in the fourth embodiment, the flowchart of FIG. 8 is executed by the processor 1, but is not limited to this, of course.

For example, when the A/D conversion circuit in the processor is used to convert a counter electromotive voltage into a digital signal, the counter electromotive voltage is sampled and a voltage between the high-level voltage and the low-level voltage obtained by the sampling is converted into a value of the digital signal. When the rotation number of the motor becomes high, the number of sampling points is reduced, which brings occurrence of a state in which the accurate digital signal is not obtained. If the rotation number of the motor is even higher, the sampling becomes impossible at all, which also brings a state in which conversion to a digital signal becomes impossible. In order to prevent such states, making a sampling frequency higher is considered, but making the sampling frequency higher causes a problem of increasing power consumption or/and raising temperature. According to the first to fourth embodiments, it is possible to perform the zero-cross determination without using the A/D conversion circuit at least during the high-speed rotation of the motor, and to control the high-speed rotation while the increase in power consumption and/or the rise in temperature are suppressed.

Further, according to the first to third embodiments, the A/D conversion circuit for the zero-cross determination becomes unnecessary, so that the processor 1 can be miniaturized, for example. Alternatively, it is possible to add another function to the processor 1 instead of the A/D conversion circuit to improve additional values.

As described above, although the invention made by the present inventors has been specifically described based on the embodiments, the present invention is not limited to the embodiments and, needless to say, can be variously modified without departing from the gist thereof. For example, a circuit block for switching the external terminals to programmability is provided between the first external terminals T1HA to T1HC, T1LA to T1LC and the control logic unit 8, and any external terminal may be capable of supplying, as the first external terminal, the PWM control signal to the control logic unit 8.

What is claimed is:
1. A semiconductor device comprising:
a first external terminal configured to be supplied with pulse width control signals;
a second external terminal configured to output a drive signal for driving a multiphase sensorless motor;
a third external terminal configured to be supplied with a counter electromotive voltage generated by driving the multiphase sensorless motor;
circuitry configured to generate an interrupt signal based on the pulse width control signals and the counter electromotive voltage, the interrupt signal indicating timing at which the counter electromotive voltage intersects with a midpoint potential of the multiphase sensorless motor; and
a fourth external terminal configured to output the interrupt signal, wherein the circuitry includes a timing extraction circuit configured to extract timing of detecting the counter electromotive voltage based on the pulse width control signals, and wherein the timing extraction circuit includes a logic circuit configured to exclude a period, in which the pulse width control signals have the same potential, from the timing of detecting the counter electromotive voltage.

2. The semiconductor device according to claim 1, wherein the circuitry includes a phase detection circuit configured to extract a phase in which the counter electromotive voltage should be detected based on the pulse width control signals.

3. The semiconductor device according to claim 1, wherein the pulse width control signals have the same potential for phase-switching.

4. A semiconductor device comprising:
a first external terminal configured to be supplied with pulse width control signals;
a second external terminal configured to output a drive signal for driving a multiphase sensorless motor;
a third external terminal configured to be supplied with a counter electromotive voltage generated by driving the multiphase sensorless motor;
circuitry configured to generate an interrupt signal based on the pulse width control signals and the counter electromotive voltage, the interrupt signal indicating timing at which the counter electromotive voltage intersects with a midpoint potential of the multiphase sensorless motor; and
a fourth external terminal configured to output the interrupt signal,
wherein the circuitry includes a timing extraction circuit configured to extract timing of detecting the counter electromotive voltage based on the pulse width control signals, and
wherein the timing extraction circuit includes a logic circuit configured to exclude a period, in which a kickback voltage is generated, from the timing of detecting the counter electromotive voltage in the multiphase sensorless motor.

5. A motor driving system comprising:
a multiphase sensorless motor;
a processor configured to output changing pulse width control signals based on an interrupt signal; and
a gate drive semiconductor device configured to drive the multiphase sensorless motor based on the pulse width control signals,
wherein the gate drive semiconductor device includes:
a first external terminal configured to be supplied with the pulse width control signals from the processor;
a second external terminal configured to output a drive signal that drives the multiphase sensorless motor;
a third external terminal configured to be supplied with a counter electromotive voltage generated by driving the multiphase sensorless motor;
circuitry configured to i) identify a target phase for detecting the counter electromotive voltage based on the pulse width control signals, and i) generate, based on the pulse width control signals, the identified target phase, and the counter electromotive voltage, a timing signal indicating timing at which the counter electromotive voltage intersects with a midpoint potential of the multiphase sensorless motor; and
a fourth external terminal configured to output the timing signal as the interrupt signal.

6. The motor driving system according to claim 5, wherein the circuitry includes a timing extraction circuit configured to extract timing of detecting the counter electromotive voltage based on the pulse width control signals.

7. The motor driving system according to claim 6, wherein the circuitry includes a phase detection circuit configured to extract a phase in which the counter electromotive voltage should be detected based on the pulse width control signals.

8. The motor driving system according to claim 7, further comprising a driver, the driver configured to drive the multiphase sensorless motor in accordance with a drive signal outputted from the gate drive semiconductor device.

9. The motor driving system according to claim 6, wherein the timing extraction circuit includes a logic circuit configured to exclude a period, in which the pulse width control signals have the same potential for phase-switching, from the timing of detecting the counter electromotive voltage.

10. The motor driving system according to claim 6, wherein the timing extraction circuit includes a logic circuit configured to exclude a period, in which a kickback voltage is generated, from the timing of detecting the counter electromotive voltage in the multiphase sensorless motor.

11. The motor driving system according to claim 5, wherein the circuitry includes a phase detection circuit configured to extract a phase in which the counter electromotive voltage should be detected based on the pulse width control signals.

12. The motor driving system according to claim 5,
wherein the processor includes a counter controlled by the interrupt signal, and
wherein a time between the interrupt signal and another interrupt signal is measured by the counter, and the pulse width control signals is changed based on the measured time.

13. The motor driving system according to claim 5,
wherein the processor includes:
a counter configured to be controlled by the interrupt signal; and
a conversion circuit configured to convert the counter electromotive voltage into a digital signal, and
wherein the processor changes the pulse width control signal based on a time measured by the counter or a digital signal obtained by the conversion circuit.

* * * * *